(12) United States Patent
Vissenberg et al.

(10) Patent No.: US 12,382,937 B2
(45) Date of Patent: Aug. 12, 2025

(54) LIGHTING DEVICE FOR ILLUMINATING AN AQUARIUM

(71) Applicant: SIGNIFY HOLDING B.V., Eindhoven (NL)

(72) Inventors: Michel Cornelis Josephus Marie Vissenberg, Eindhoven (NL); Lucas Louis Marie Vogels, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 13 days.

(21) Appl. No.: 17/637,021

(22) PCT Filed: Aug. 20, 2020

(86) PCT No.: PCT/EP2020/073273
§ 371 (c)(1),
(2) Date: Feb. 21, 2022

(87) PCT Pub. No.: WO2021/037647
PCT Pub. Date: Mar. 4, 2021

(65) Prior Publication Data
US 2024/0423173 A1    Dec. 26, 2024

(30) Foreign Application Priority Data
Aug. 27, 2019 (EP) ..................... 19193673

(51) Int. Cl.
*A01K 63/06* (2006.01)
*F21V 3/04* (2018.01)
(Continued)

(52) U.S. Cl.
CPC .............. *A01K 63/06* (2013.01); *F21V 3/049* (2013.01); *F21V 14/08* (2013.01);
(Continued)

(58) Field of Classification Search
CPC ...... A01K 63/06; A01K 63/006; F21V 3/049; F21V 14/08; F21V 5/002; F21V 5/004;
(Continued)

(56) References Cited

U.S. PATENT DOCUMENTS

| | | | |
|---|---|---|---|
| 2003/0137829 A1* | 7/2003 | Ayers | F21V 13/12 362/101 |
| 2012/0162979 A1* | 6/2012 | Ng | H01L 25/0753 362/231 |

(Continued)

FOREIGN PATENT DOCUMENTS

| | | | | |
|---|---|---|---|---|
| CN | 201575367 U | * | 9/2010 | |
| DE | 102008013589 A1 | * | 6/2009 | ............. A01K 63/06 |

(Continued)

*Primary Examiner* — Erin Kryukova

(57) ABSTRACT

A LIGHTING DEVICE for illuminating an aquarium (100), comprising: —a base layer (111, 611); —a plurality of lighting elements (111, 112, 113, 212, 213) mounted on the base layer (111, 611) and comprising a first and a second subset (630A) of lighting elements (111, 112, 113, 212, 213) arranged for emitting a first and a second spectrum of light respectively; —a light transmission affecting device arranged for affecting the transmission of light from the plurality of lighting elements (111, 112, 113, 212, 213); wherein the light transmission affecting device is arranged for passing (420) at least a part of the light from at least one lighting element (112, 212, 213, 312) of the first subset (112) having the first emitting spectrum and processing (430) the light from at least one lighting element (112, 212, 213, 312) of the second subset (630A) having the second emitting spectrum; wherein the first emitting spectrum comprises white light or a first colored light; wherein the first colored light comprises wavelength in a first range with peak wavelength below (485) 485 nm; and the second emitting spectrum comprises a second colored light; wherein the second
(Continued)

colored light comprises wavelength in a second range with a peak wavelength larger than 485 nm.

11 Claims, 7 Drawing Sheets

(51) Int. Cl.
    *F21V 14/08*     (2006.01)
    *F21W 131/308*     (2006.01)
    *F21Y 105/12*     (2016.01)
    *F21Y 113/13*     (2016.01)
    *F21Y 115/10*     (2016.01)

(52) U.S. Cl.
    CPC .... *F21W 2131/308* (2013.01); *F21Y 2105/12* (2016.08); *F21Y 2113/13* (2016.08); *F21Y 2115/10* (2016.08)

(58) Field of Classification Search
    CPC ... F21V 5/005; F21V 5/007; F21W 2131/308; F21Y 2105/12; F21Y 2113/13; F21Y 2115/10; F21Y 2113/10; F21Y 2113/30; G02B 6/0068; G02B 6/005; G02B 6/0058
    See application file for complete search history.

(56) References Cited

U.S. PATENT DOCUMENTS

| | | | |
|---|---|---|---|
| 2013/0033851 A1* | 2/2013 | Wang | F21V 19/0055 362/101 |
| 2013/0039062 A1* | 2/2013 | Vinther | F21V 21/30 362/235 |
| 2013/0118414 A1* | 5/2013 | Komada | A01K 63/06 313/503 |
| 2013/0250211 A1* | 9/2013 | Chao | F21V 14/003 362/277 |
| 2017/0111972 A1 | 4/2017 | Oepts et al. | |
| 2018/0027779 A1* | 2/2018 | Vissenberg | F21V 7/0083 |
| 2019/0032891 A1 | 1/2019 | Dijken et al. | |
| 2020/0126958 A1* | 4/2020 | Ng | H01L 25/0753 |

FOREIGN PATENT DOCUMENTS

| | | | | |
|---|---|---|---|---|
| DE | 102012017613 A1 * | 3/2014 | | A01K 63/06 |
| EP | 2732701 A1 * | 5/2014 | | A01K 63/06 |
| JP | 2017181942 A | 10/2017 | | |
| WO | 2019134893 A1 | 7/2019 | | |

* cited by examiner

LIGHTING DEVICE FOR ILLUMINATING AN AQUARIUM

CROSS-REFERENCE TO PRIOR APPLICATIONS

This application is the U.S. National Phase application under 35 U.S.C. § 371 of International Application No. PCT/EP2020/073273, filed on Aug. 20, 2020, which claims the benefit of European Patent Application No. 19193673.1, filed on Aug. 27, 2019. These applications are hereby incorporated by reference herein.

FIELD OF THE INVENTION

The invention relates to a lighting device for illuminating an aquarium. The invention further relates to a method and a system for illuminating an aquarium.

BACKGROUND

When directional light enters a water volume through a water surface, so-called caustic patterns may be created and projected on a surface in the water volume, e.g. at the bottom of an aquarium. Such projected patterns, herein also referred to as "caustics" or "caustic effects", occur when the light is highly collimated (such as light from the sun or a from a narrow beam light source) or when the source is very small such as an LED. Large diffuse sources, like conventional tungsten tubes, or indirect lighting, do not produce caustics.

LEDs have the advantage of high efficacy and easy spectral tunability. LED may be used to emit light of different color spectrum. However, when using an array of point-like sources, such as an array of LEDs, for illuminating an aquarium, this may result in restlessly moving caustic patterns in and around the aquarium, as well as color patterns and colored shadows when colored LEDs or white RGB LEDs are used.

US 2018/027779 A1 discloses an aquarium lighting system comprising a set of lighting elements each with a beam shaping element for passing first light which is emitted from the lighting element at an angle to the normal below a threshold and for processing second light which is emitted from the lighting element at an angle to the normal above the threshold. The processed second light comprises a greater amount of scattering compared to the passed first light and caustic patterns generated by direct light at wide angles are avoided and caustic patterns generated by direct light at small angles are contained in the aquarium.

SUMMARY OF THE INVENTION

The inventors have realized that although caustics inside the aquarium can be enhanced by providing less scattering to the light emitted by lighting devices (e.g. LED) illumination the aquarium, for example by allowing 'direct view' on the LED point sources, which also improves the optical efficiency, such 'direct view' also enhances colored caustic patterns from colored lighting devices (e.g. color LEDs) which appear unnatural. The inventors have further realized that a high number of point sources creates an overlay of multiple caustics patterns, which also is very unnatural.

It is therefore an object of the present invention to avoid unwanted caustic effects in the aquarium and to provide a more natural caustic effect.

According to a first aspect, the object is achieved by a lighting device for illuminating an aquarium, comprising: a base layer; a plurality of lighting elements mounted on the base layer and comprising a first and a second subset of lighting elements arranged for emitting a first and a second spectrum of light respectively; a light transmission affecting device arranged for affecting the transmission of light from the plurality of lighting elements; wherein the light transmission affecting device is arranged for passing at least a part of the light from at least one lighting element of the first subset having the first emitting spectrum and processing the light from at least one lighting element of the second subset having the second emitting spectrum.

A plurality of lighting elements, comprised in an aquarium lighting device, comprises a first and a second subset arranged for emitting a first and a second spectrum of light. Electromagnetic radiation in this range of wavelengths that are visible to the human eye is called visible light or simply light. The light transmission affecting device is an optical element which may for example surround or partially surround the plurality of lighting elements, such as a cluster of LEDs that are closely spaced together and affecting (at least partially) the light emitted from these lighting elements.

The light transmission affecting device affects the transmission of light from the plurality of lighting elements, wherein the affecting is either passing or processing. The passing may comprise passing at least a part of the light or completely passing the light. Since, the light transmission affecting device passes or processes the light based on whether it is emitted by a lighting element from the first subset of lighting elements or a lighting element from the second subset of lighting elements respectively, each with a corresponding emission spectrum, direct light from lighting element(s) from the second subset of lighting elements, emitting light in the second emission spectrum is avoided and corresponding caustic effects in that second emission spectrum are therefore also avoided.

In an embodiment, the first emitting spectrum may comprise white light or a first colored light; wherein the first colored light may comprise wavelength in a first range; and the second emitting spectrum may comprise a second colored light; wherein the second colored light may comprise wavelength in a second range.

The first emitting spectrum may comprise light which is perceived natural in an aquarium; wherein the second emitting spectrum may comprise light which is perceived non-natural in an aquarium. The first subset of lighting elements may be arranged for emitting white light spectrum or a first colored light and the second subset of lighting elements may be arranged for emitting a second colored light spectrum. In an example, at least a part of the white light or the first colored light is passed and remaining part of the white light or the first colored light is processed. White light is considered a combination of lights of different wavelengths in the visible electromagnetic spectrum. White light may have different color temperatures. Color temperature is defined in degrees Kelvin; a warm light is around 2700K, moving to neutral white at around 4000K, and to cool white, at 5000K or more. The first colored light may comprise a narrow band spectrum; wherein the first range may comprise wavelength of colors which are perceived natural in an aquarium, for example, colors with peak wavelength below 485 nm may be considered as natural colors such as blue and/or UV sources. The second colored light may comprise a narrow band spectrum; wherein the second range may comprise wavelength of colors which are perceived non-natural in an aquarium, for example a peak wavelength larger than 485 nm may be considered as non-natural colors such as cyan, amber etc. A high number of point sources creates an overlay of multiple caustics effect, which is very unnatural. The sun creates caustics that originate from a single source. Therefore, passing (at least a part of) the light from a limited number of lighting element having white emitting spectrum or the first color, which is also a 'more natural light', mimics natural behavior and creates more natural caustic effects.

In an embodiment, the plurality of lighting elements may be arranged in a geometric distribution on the base layer and wherein the light transmission affecting device may be designed to match and align with the geometric distribution of the plurality of lighting elements on the base layer.

For example, for different geometric distributions of the base layer (and corresponding plurality of lighting elements mounted on the base layer) such as a circle or polygonal shape, the light transmission affecting device may have a corresponding shape and be aligned with the base layer. The geometric distribution may also comprise a distribution grid of the plurality of lighting elements on the base layer, e.g. the plurality of lighting elements may be mounted in an orthogonal grids, with two sets of grid lines perpendicular to each other such as square grid, or isometric grids, with three sets of lines at 60-degree angles to each other such as triangular grid. Other types of grids, e.g. hexagonal grid, known in the art are not excluded. The corresponding matching of grid shape and the alignment with the position of the lighting elements may be required to correctly pass or process the light from the respective lighting elements.

In an embodiment, the at least one lighting element from the first subset, for which the light transmission affecting device is arranged for passing at least a part of the light, may be selected based on physical location of the at least one lighting element in the geometric distribution of the plurality of lighting elements on the base layer, the position of the at least one lighting element on the base layer, the position of the at least one lighting element in the lighting device and/or with respect to other elements in the plurality of lighting elements.

In some cases, not all the lighting elements in the first subset is selected. The selection of at least one lighting element may be based on the physical location of the at least one lighting element on the base layer. For instance, the lighting elements mounted near the center of the base layer may be preferred while the lighting elements closers to the edges may be avoided. Additionally, or alternatively, the selection may be based on the respective distance between the lighting elements and the other lighting elements in the first and/or the second subset. For instance, two white emitting spectrum elements which are positioned very closed to each other may be avoided. A proper selection of the at least one respective element in the first subset further improves the natural appearance caustic effects in the aquarium.

In an embodiment, the distance between any two nearest neighboring lighting elements in the second subset may be less than half the average distance between nearest neighboring lighting elements in the first subset.

The positioning of the plurality of lighting elements on the base layer is an important factor for creating natural caustic effects. In this embodiment, the distance between any two nearest neighboring lighting elements in the second subset may be chosen such that it is less than half the average distance between nearest neighboring lighting elements in the first subset. The effect thereof is plurality of lighting elements in the second subset are more clustered than the plurality of lighting elements in the first subset resulting in the light from a cluster of lighting elements in the second subset to be better mixed compared to that the light from the lighting elements in the first subset. Especially if the lighting elements in such a cluster emit light of a different color, e.g. if a cyan LED and an amber LED are in the same cluster, such color mixing reduces colored light effects or colored caustic effect in the aquarium which are generally considered unnatural.

In an embodiment, the light transmission affecting device may comprise at least one opening co-located with the at least one lighting element of the first subset; and wherein the light transmission affecting device may be arranged for passing at least a part of the light from the at least one lighting element of the first subset from the at least one opening.

One of the possible ways, among others, to pass the light from the at least one lighting element of the first subset may be to provide the light transmission affecting device with at least one opening co-located with the at least one lighting element of the first subset. In this case, the light from the at least one lighting element from the first subset co-located with the at least one opening is always (at least partially) passed.

In an embodiment, the light transmission affecting device may comprise at least one removable element arranged for covering the at least one opening; and wherein the light transmission affecting device may be arranged for passing at least a part of the light from the at least one lighting element of the first subset when the at least one removable element is removed from the at least one opening.

The light transmission affecting device may further comprise at least one removable element arranged for covering the at least one opening such that when the at least one removable element is removed from the at least one opening, the light is passed via the at least one opening. The removability of the at least one removable element may provide the advantage of dynamically selecting, manually by the user or automatically by means of a controller controlling the removing/adding of the removable element, the at least one lighting element from the first subset over time. The at least one removable element may comprise a disc, a lid.

In an embodiment, a location and/or size/physical dimension of the opening may be determined based on a crosstalk between the at least one lighting element and a neighboring lighting element in the first subset and/or in the second subset.

The size/physical dimension of the at least one opening may be limited to reduce crosstalk from neighboring lighting elements such that no direct light by a neighboring lighting element is able to pass directly through the at least one opening. Hence, a further improved caustic effect is achieved by properly selecting the physical dimension of the at least one opening.

In an embodiment, the light transmission affecting device may comprise a plate having a patterned diffuser, with at least one opening in the diffuser pattern for passing at least a part of the light from the at least one lighting element of the first subset; and wherein the patterned diffuser may be arranged for processing the light, by diffusing the light, from the at least one lighting element of the second subset.

In this example, the light transmission affecting device comprises a plate having a patterned diffuser, with an opening in the diffuser pattern for passing at least a part of the light from the at least one lighting element of the first subset. The opening in the diffuser pattern may be a clear patch. The light from the second subset may be diffused using the diffuser pattern such that the effect of the light from the second subset of lighting elements on the creation of caustic effect is minimized.

In an embodiment, the light transmission affecting device may comprise a light guide having at least one opening in the light guide for passing at least a part of the light from the at least one lighting element of the first subset; and wherein the light guide may be arranged for processing the light, by distributing the light, from the at least one lighting element of the second subset. The light guide may be a patterned light guide.

Additionally, or alternatively to providing at least one opening/removable element and/or diffusing plate with an opening, the light transmission affecting device may comprise a light guide having at least one (patterned) opening, e.g. a hole, in the light guide for passing at least a part of the light from the at least one lighting element of the first subset. In this example, the light guide may be arranged for processing the light, by distributing and outcoupling the light, from the at least one lighting element of the second subset such that the effect of the light from the second subset on the creation of caustic effect is minimized. Typically light guides are indented to transport/distribute light across the light guide and patterned surface structures are provided to couple the light in and/or out of the light guide. These surface structures may be printed, embossed, coated with scattering particles etc. and used to for example create a diffuse light exit window.

In an embodiment, the light transmission affecting device may comprise a combination of the plate having the patterned diffuser and the light guide; wherein the at least one opening may be a combination of a hole in the light guide and a clear patch in the (patterned) diffuser. A clear patch is an area on the diffuser which does not process the light.

When the light transmission affecting device comprises a plate having a patterned diffuser and at least one opening (a clear patch) in the diffuser pattern for passing light, all the plurality of lighting elements may be visible from a different angle, therefore to improve the lighting system, a second optical element such as a light guide with holes may be added to the diffuser. In such case, the at least one opening may be a combination of the hole in the light guide and the clear patch in the (patterned) diffuser. The diffuser may be used as a cover plate for close the lighting device.

In an embodiment, the each of the plurality of lighting devices may comprise an LED.

In an embodiment, the lighting device may further comprise four first subsets of lighting elements, wherein the lighting elements in each first subset are arranged in a first geometric distribution, the four first subsets provided in corner areas on the base layer with their respective first geometric distribution of lighting elements being diagonally mirrored around the center of the base layer; two further first subsets of lighting elements, wherein the lighting elements in each further first subset are arranged in a further first geometric distribution, the two further first subsets provided in first center areas on the base layer with their respective further first geometric distribution of lighting elements being mirrored around the center of the base layer; four second subsets of lighting elements, wherein the lighting elements in each of the four second subsets area arranged in a second geometric distribution, the four second subsets provided in second center areas on the base layer with their respective second geometric distribution of lighting elements being diagonally mirrored around the center of the base layer; and a light transmission affecting device comprises four openings for mapping to four lighting elements of the two further first subsets wherein the locations of the four openings are diagonally mirrored around a center of the light transmission affecting device to map with four lighting elements diagonally mirrored around the center of the base layer and wherein the four openings are located off-center to their corresponding lighting element. In a preferred execution of this embodiment, the first subsets and further first subsets comprise lighting elements with an emitting spectrum of white (warm white and/or cool white) and/or blue light and the second subsets of lighting elements comprise lighting elements with an emitting spectrum of cyan and/or red/amber light.

According to a second aspect, the object is achieved by a method of illuminating an aquarium, comprising: providing a light output from a plurality of lighting elements comprising a first and a second subset of lighting elements arranged for emitting a first and a second spectrum of light respectively; passing at least a part of the light from at least one lighting element of the first subset having the first emitting spectrum; processing the light from at least one lighting element of the second subset having the second emitting spectrum, and; providing the passed and the processed light to the aquarium.

The method may further include arranging the plurality of the lighting elements above the water surface.

According to a third aspect, the object is achieved by controller for controlling a lighting device for illuminating an aquarium comprising: an input and an output interface; a communication unit; a processor arranged for: controlling illumination from a plurality of lighting elements of the lighting device; and/or controlling at least one removable element of the lighting device.

According to a fourth aspect, the object is achieved by a lighting system for illuminating an aquarium comprising a lighting device according to the first aspect; and a controller according to the third aspect.

According to a fifth aspect, the object is achieved by an aquarium comprising a water container and a lighting system for illuminating an aquarium according to the fourth aspect.

In an embodiment, in use, the lighting device may be positioned 10 to 30 cm above water surface. The lighting device may be provided with mounting means to establish this 10 to 30 cm distance above the water surface.

It should be understood that the method and the lighting system may have corresponding and/or similar and/or identical features and advantages as the above-mentioned lighting device.

BRIEF DESCRIPTION OF THE DRAWINGS

The above, as well as additional objects, features and advantages of the disclosed systems, devices and methods will be better understood through the following illustrative and non-limiting detailed description of embodiments of systems, devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

In aquarium lighting, so-called caustic patterns are projected on the bottom when directional light enters a water surface. Such projected patterns occur when the light is highly collimated (like from the sun or from a narrow beam spot) or a single light source when that light source is very small (like an LED). However, an array of point-like light sources may result in too many caustic patterns and restlessly moving caustic patterns in the aquarium, as well as colored caustic patterns and colored shadows. To reduce the caustic patterns in an aquarium a diffuse plate may cover the array of point like light source. However, this would also 'blur' the caustic patterns. To enhance the natural appearance of caustics patterns inside the aquarium, the present disclosure suggests that a limited number of lighting elements is aligned with a clear exit window and the remaining lighting elements are aligned with a diffuse exit window.

Figure 1:
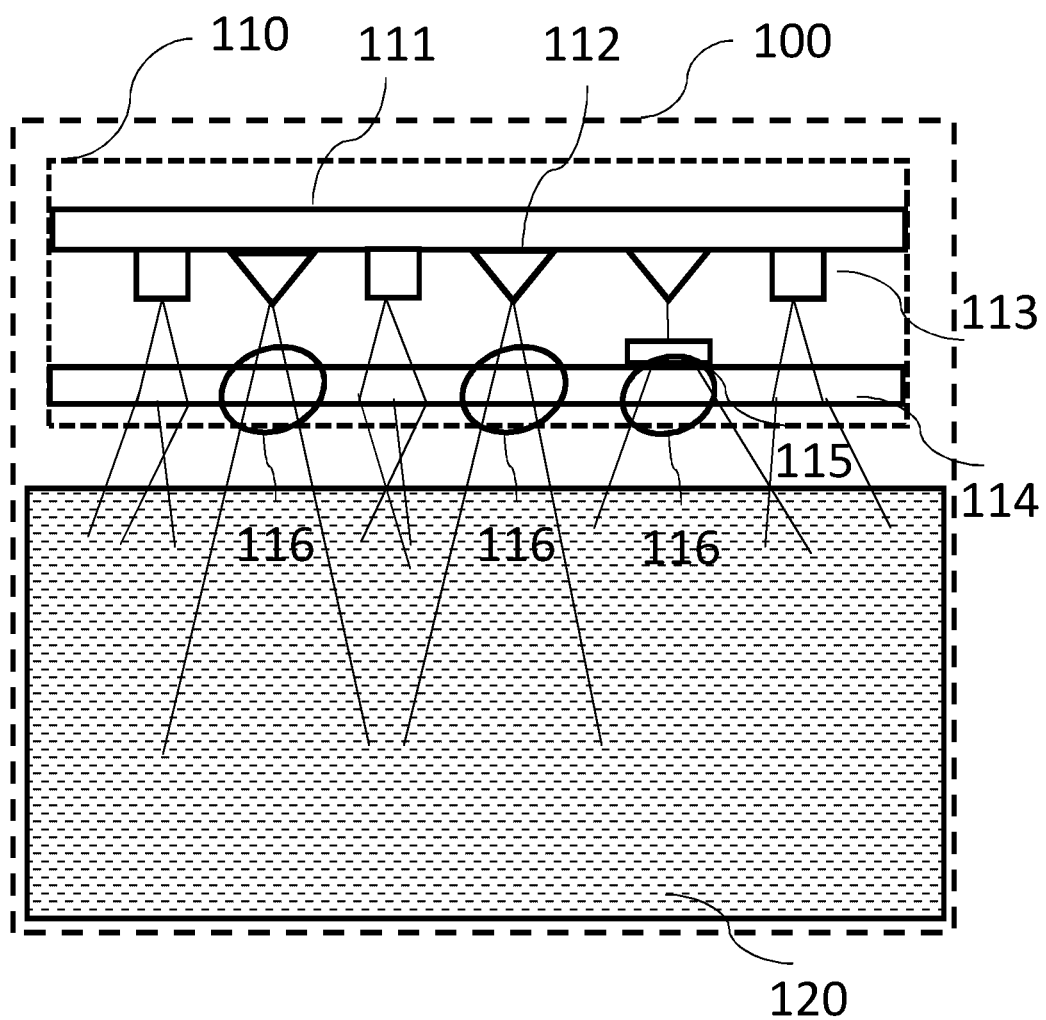
FIG. 1 shows schematically an embodiment of an aquarium with a lighting device for illuminating the aquarium.

FIG. 1 shows schematically an embodiment of an aquarium 100 with the lighting device 110 for lighting the aquarium 100. The aquarium 100 may comprise a water container 120 and may further, not shown in the FIG. 1, comprise ornaments, water filters, plants etc. The lighting device 110 may comprise a first subset of lighting elements 112 (shown as triangles) and a second subset of lighting elements 113 (shown as rectangles) mounted on a base layer 111. The base layer 111 may comprise a printed circuit board. In an embodiment, the each of the plurality of lighting elements may comprise an LED. A lighting device (e.g. a luminaire) is a device or structure arranged to emit light suitable for illuminating an environment, e.g. an aquarium, providing or substantially contributing to the illumination on a scale adequate for that purpose. The lighting element may comprise at least one light source or lamp, such as an LED-based light source, gas-discharge lamp or filament bulb, etc.

The first subset of lighting elements 112 may be arranged for emitting a first light spectrum. The visible spectrum is the portion of the electromagnetic spectrum that is visible to the human eye. Visible light of a narrow band of wavelengths (monochromatic light) is often called a pure spectral color, e.g. violet, orange, red etc. Other colors can only be made from a mix of multiple wavelengths, e.g. pink, purple etc. In an example, the first light spectrum is white light or a first colored light. White light may be a full-spectrum light with a mixture of all the wavelengths of the visible spectrum, e.g. a phosphor converted white LED. White light may also be a wide-spectrum light with a mixture of wavelengths of the visible spectrum that combine into a white-perceived light, e.g. an RGB white LED. White light may have different color temperatures, wherein the color temperature of a light source is the temperature of an ideal black-body radiator that radiates light of a color comparable to that of the light source. Color temperature is a characteristic of visible light and is measured in degrees Kelvin (K); a warm light is around 2700K, moving to neutral white at around 4000K, and to cool white, at 5000K or more." The first colored light may comprise a narrow band spectrum; wherein the first range may comprise wavelength of colors which are perceived natural in an aquarium, for example, colors with peak wavelength below 485 nm may be considered as natural colors such as blue and/or UV sources.

The second subset of lighting elements 113 may be arranged for emitting a second light spectrum. In an example, the second light spectrum is a second colored light. The second colored light may comprise a narrow band spectrum; wherein the second range may comprise wavelength of colors which are perceived non-natural in an aquarium, for example a peak wavelength larger than 485 nm to may be considered as non-natural colors such as cyan, amber etc. For example, red color has wavelength between 625-740 nm and a cyan color has wavelengths between 490-520 nm. The lighting elements in the second subset may emit different light spectrums, e.g. some elements emit cyan and other elements emit an amber color. In another example, some or all of the elements emit in the second subset emit the same light spectrum, e.g. yellow (565-590) nm wavelength). The number of lighting elements in the first and the second subset may be different or the same.

In an example, the first light spectrum may comprise a white light or a first colored light. For example, the bluish and white colors may be considered as natural colors for creating a natural caustic, for instance, these are the absolute color points the natural aquatic day rhythm reaches (white during day, blue during evening/night). In this example, the second light spectrum may comprise Amber and Cyan/green, which may not be considered as natural color points but are used to correct the spectrum for finding an optimal balance between good growth of the corals such as plants, fishes etc. and natural color rendering.

The lighting device 110 may comprise a light transmission affecting device 114. In this exemplary figure, the light transmission affecting device 114 may comprise at least one opening 116. The at least one opening 116 may comprise a mechanical opening and/or provide an opening in an optical sense, such as a clear patch in a light diffuser. The light transmission affecting device 114 may further comprise at least one removable element 115 which may be arranged for covering the at least one opening 116. The at least one opening 116 may be co-located with the at least one lighting element 112 of the first subset. The light transmission affecting device 114 may be arranged for passing at least a part of the light from the at least one lighting element 112 of the first subset from the at least one opening 116. The passing of light may comprise the light going through the transmission affection device 114 without changing the direction of light. In another example, the light transmission affecting device 114 may be arranged for passing at least a part of the light from the at least one lighting element 112 of the first subset when the at least one removable element 115 may be removed from the at least one opening 116. Alternatively, when the at least one removable element 115 is not removed from the at least one opening 116, the light from the first subset may be processed, e.g. the light may be completely blocked, or the light is diffused. At least one removable element 115 may be a disc or a lid, or a movable or sliding disc/lid. A lid, also known as a cover, serves as the closure or seal, usually one that completely or partially closes the at least one opening 116. The at least one removable element 115 may be made of any suitable material and may take any form as long as it is suitable for covering the at least one opening 116. The at least one removable element 115 may be automatically removed or it may be removed by a user.

A physical dimension/size of the at least one opening and the corresponding at least one removable element 115 may be determined based on a potential crosstalk between the at least one lighting element 112-113 and a neighboring lighting element 112-113 in the first subset and/or in the second subset. For example, no direct light by a neighboring lighting element should be able to pass directly through the at least one removable element/at least one opening. In an example, the physical dimension/size of the at least one opening is different from at least one removable element 115 which is used to cover the at least one opening. In another example, the physical dimension/size of the at least one opening is same as at least one removable element 115.

The plurality of lighting elements 112-113 may be arranged in a geometric distribution on the base layer 111 and wherein the light transmission affecting device 114 may be designed to match the geometric distribution of the plurality of lighting elements on the base layer 111. For example, a rectangular, circular shape, or the plurality of lighting elements 112-113 may be arranged in non-rectangular grid (e.g. multiple triangular grid sections mutually arranged in different orientations).

In an example, not all the lighting elements in the first subset 112 are selected. The selection of at least one lighting element 112 may be based on the physical location of the at least one lighting element 112 on the base layer. Other considerations may be taken into account for the selection. For example, the at least one lighting element with white emitting spectrum should be at least 10 mm away from at least one lighting element with blue emitting spectrum. The number of selected at least one lighting elements may determine the dynamics of the caustics pattern. Too many selected at least one lighting elements would create too many overlapping caustic patterns and hence increase the dynamic frequency of the patterns (which disturbs the image). The inventors have found that, depending on the size of the lighting device or the aquarium, e.g. 4 or max 8 selected at least one lighting elements are sufficient. Placing the lighting elements of the first subset somewhat centered on the base layer 111 may provide the idea that the caustics are coming from a larger point source (such as the sun) which has a more natural feeling. Having caustics around the edges of the base layer 111 may be possible but can also create some over dramatic effects on the sides of the aquarium 100. The selection may be based on the physical location of the lighting element 112 in the first subset with respect to the objects (not shown, e.g. ornaments, water filter etc.) in the aquarium 100. The selection of the at least one lighting element 112 of the first subset may be dynamic and may vary over time. The selection of the at least one lighting element 112 may be based on the color temperature of the white emitting light from the lighting element. For example, cold white light may be selected.

Figure 2:
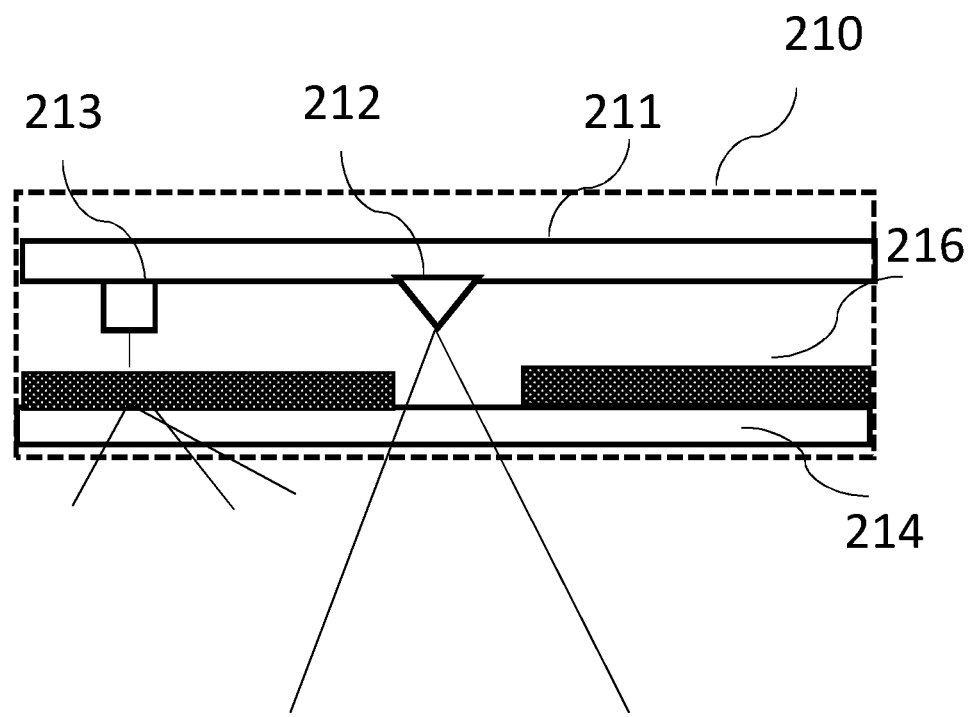
FIG. 2 shows schematically an embodiment of the lighting device.

FIG. 2 shows schematically an embodiment of a lighting device 210. FIG. 2 shows an example in which the direct view of the lighting elements 212-213 is processed for instance, blocked, by using a clear cover plate 214 with a patterned scattering element 216 (which may be located on the LED side of the clear cover plate or alternatively on the opposite side). The pattern defines an opening aligned with the lighting element 212. For the lighting element 212 of the first subset with the first emitting light spectrum, the clear cover plate provides no or only very lightly scattering while for the lighting elements 213 of the second subset, the patterned scattering element provides stronger scattering. Hence the light from the lighting element 213 from the second element with the second light emitting spectrum is processed while the light from the lighting element 212 from the first element with the first light emitting spectrum is passed. The transition between the low and high amounts of scattering is preferably soft to avoid sharp cut off effects.

The scattering element may be reflective and/or transmissive, and may be achieved by a coating, for example using paint dots with varying density or size, a surface treatment for example surface roughness, or a variation of scattering particle density within the bulk of the material.

Figure 3:
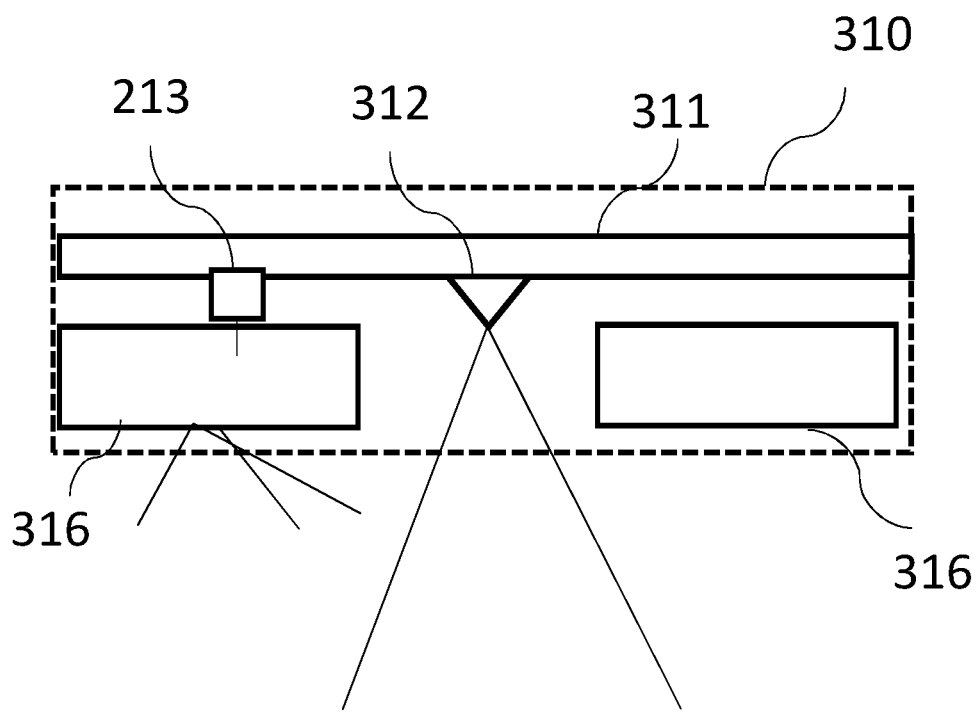
FIG. 3 shows schematically another embodiment of the lighting device.

FIG. 3 shows schematically another embodiment of a lighting device 310. FIG. 3 shows an example wherein a light guiding element has an opening aligned with the lighting element 312 of the first subset, so that light emitted at a narrow angle from the optical axis of lighting element 312 is passed (as depicted in FIG. 3) and light emitted at a wide angle from the optical axis of the lighting element 312 (not shown) enters the light guide, for example at a side surface delimiting the opening or part of a top surface. For the lighting element 213 of the second subset, light enters the light guide at the top surface and is then captured by the light guide 316. It is subsequently coupled out from the light guide by a scattering element or surface. The scattering element may again be reflecting or transmitting, at any side of the light guide, and it may have a varying scattering strength depending on the position. For example, a scattering surface pattern may be applied to the outer surface at the bottom of the light guide 316.

In the examples above, the light from the lighting element 212-312 of the first subset having the first emitting light spectrum is passed with no optical processing at all. Alternatively, the light transmission affecting element 114 may comprise a scattering element for scattering the (directional) light from the lighting element 212-312 of the first subset, with a smaller amount of scattering than the processing of the light from the lighting element 213-313 of the second subset having second emitting light spectrum. This may comprise a portion of reduced scatting in the window (FIG. 2) or a low scattering plate mounted approximate the light guide (FIG. 3).

The low scattering plate may have clear portion outside the area of the openings of the light transmission affecting device or may have a uniform low scattering effect plate covering the entire lighting arrangement. In the latter case, there are two scattering mechanisms in series for the lighting elements 213-313 of the second subset, i.e. the scattering of patterned diffuser 216 and the scattering of the additional low scattering plate, whereas in the first case, only the single scattering effect is provided for the lighting elements 212-312 of the first subset, i.e. the scattering of the additional low scattering plate. The light from the lighting elements 212-312 remains more directional than the light from the lighting elements 213-313.

Figure 4:
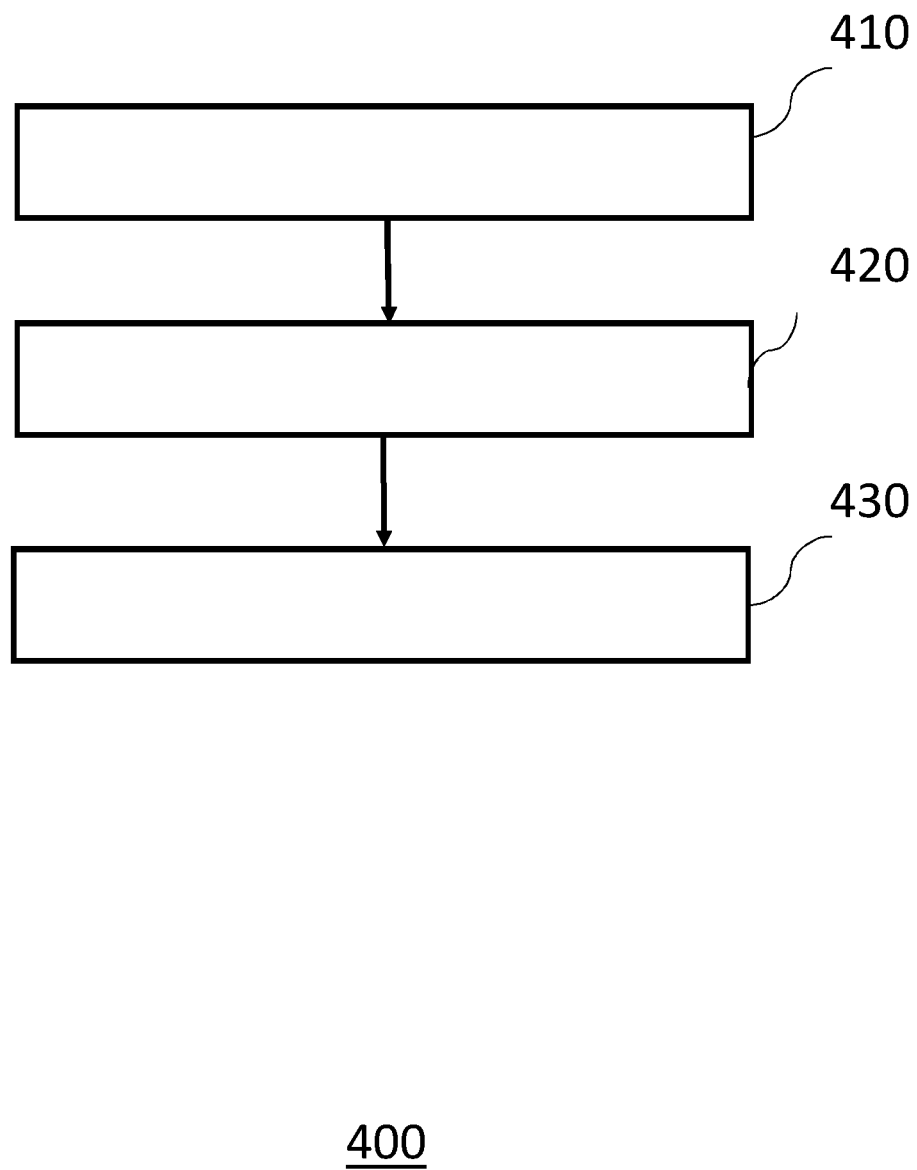
FIG. 4 shows schematically a method of lighting the aquarium.

FIG. 4 shows schematically a method 400 of lighting an aquarium 100. The method 400 comprising: providing 410 a light output from a plurality of lighting elements 111-112 comprising a first and a second subset of lighting elements arranged for emitting a first and a second spectrum of light respectively. In an embodiment, the first emitting spectrum may comprise white light and a first colored light and the second emitting spectrum may comprise a second colored light. In an embodiment, the plurality of lighting elements is provided at a distance above the aquarium or above a water surface of the aquarium.

The method 400 may further comprise passing 420 the light from at least one lighting element of the first subset having the first emitting spectrum; and processing 430 the light from at least one lighting element of the second subset having the second emitting spectrum. The passing 420 and processing 430 of the light may be performed by a light transmission affecting device 114 which may be comprising a plate having a patterned diffuser, with at least one opening in the diffuser pattern for passing at least a part of the light from the at least one lighting element of the first subset; and wherein the patterned diffuser may be arranged for processing the light, by diffusing the light, from the at least one lighting element of the second subset. Additionally, or alternatively, the processing 430 may be performed by a light transmission affecting device 114 which may comprise a light guide having at least one patterned opening in the light guide for passing at least a part of the light from the at least one lighting element of the first subset; and wherein the light guide may be arranged for processing the light, by distributing the light in the light guide and outcoupling the light from the light guide, from the at least one lighting element of the second subset. Other methods and/or devices for passing at least a part of the light from the at least lighting element of the first subset and optically processing the light from the lighting elements from the second subset, known in the art, is not excluded.

Figure 5:
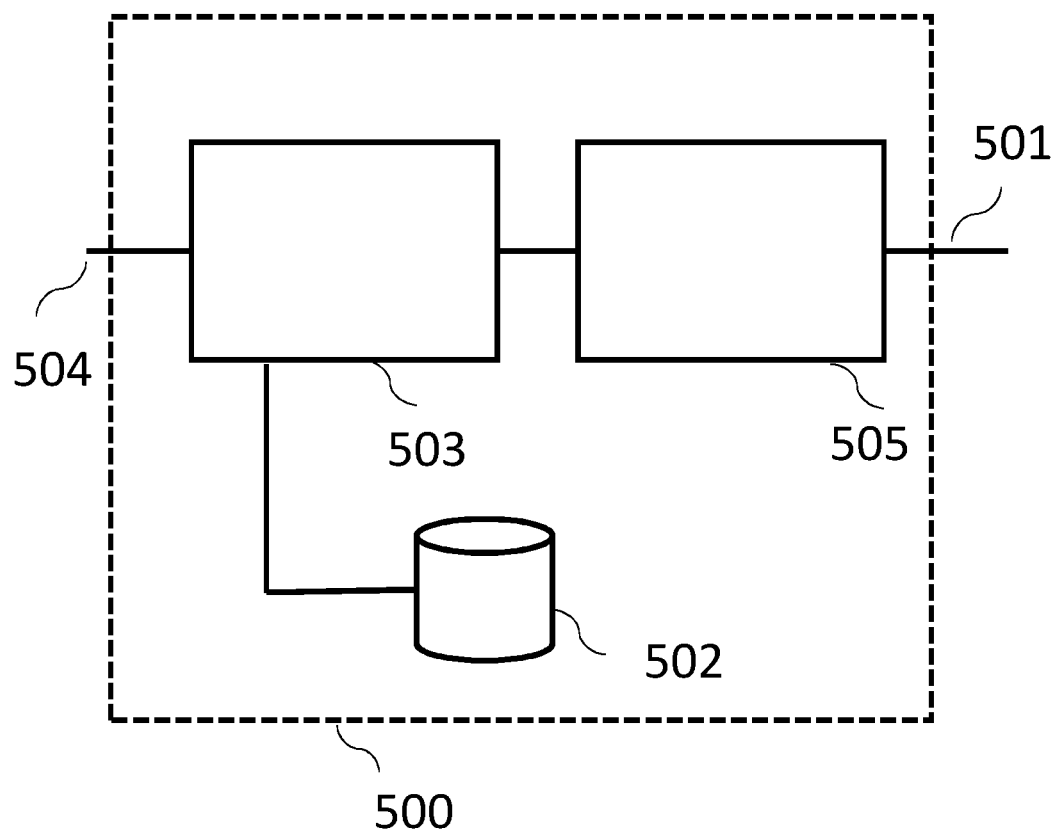
FIG. 5 shows schematically a controller of an aquarium lighting system lighting the aquarium.

An aquarium lighting system for lighting an aquarium 100 may comprise the lighting device 110 and a controller 500 as shown in FIG. 5. The controller 500 may be implemented in a unit separate from the plurality of lighting elements 112-113 and/or the light transmission affecting device 114, such as in wall panel, desktop computer terminal, or even a portable terminal such as a laptop, tablet or smartphone. Alternatively, the controller 500 may be incorporated in the lighting device. Further, the controller 500 may be implemented as part of the aquarium 100 or remote from aquarium 100 (e.g. on a server); and the controller may be implemented in a single unit or in the form of distributed functionality distributed amongst multiple separate units, or the controller 500 may be implemented in the form of dedicated hardware circuitry, or configurable or reconfigurable circuitry such as a PGA or FPGA, or any combination of these. The controller 500 may comprise an input interface 504 and output interface 501 for receiving and sending control signals to the plurality of lighting elements and/or to the lighting transmission affecting device 114. The controller 500 may comprise a processing unit 503 arranged for controlling illumination from a plurality of lighting elements of the lighting device; and/or controlling at least one removable element 115 of the lighting device 100. In an example, the controller 500 may preferably have a wired connection with the at least on removable element 115 and when the at least one removable element 115 is automatically controllable, for instance when the at least one removable element 115 is a sliding disc, the processing unit 503 is arranged for generating a control signal to control the at least one removable element 115. The controller 500 may comprise an LED driver such as a constant current driver arranged for controlling the plurality of lighting elements of the lighting device. The controller 500 may (optionally) comprise a memory 502 coupled to the processing unit 503. The controller 500 may (optionally) comprise a communication unit 505 coupled to the output interface 501 to communicate control signals to the plurality of lighting elements and/or to the light transmission affecting device 114. The communication with the plurality of lighting elements and/or to the light transmission affecting device 114 may be wired and/or wireless.

Figure 6:
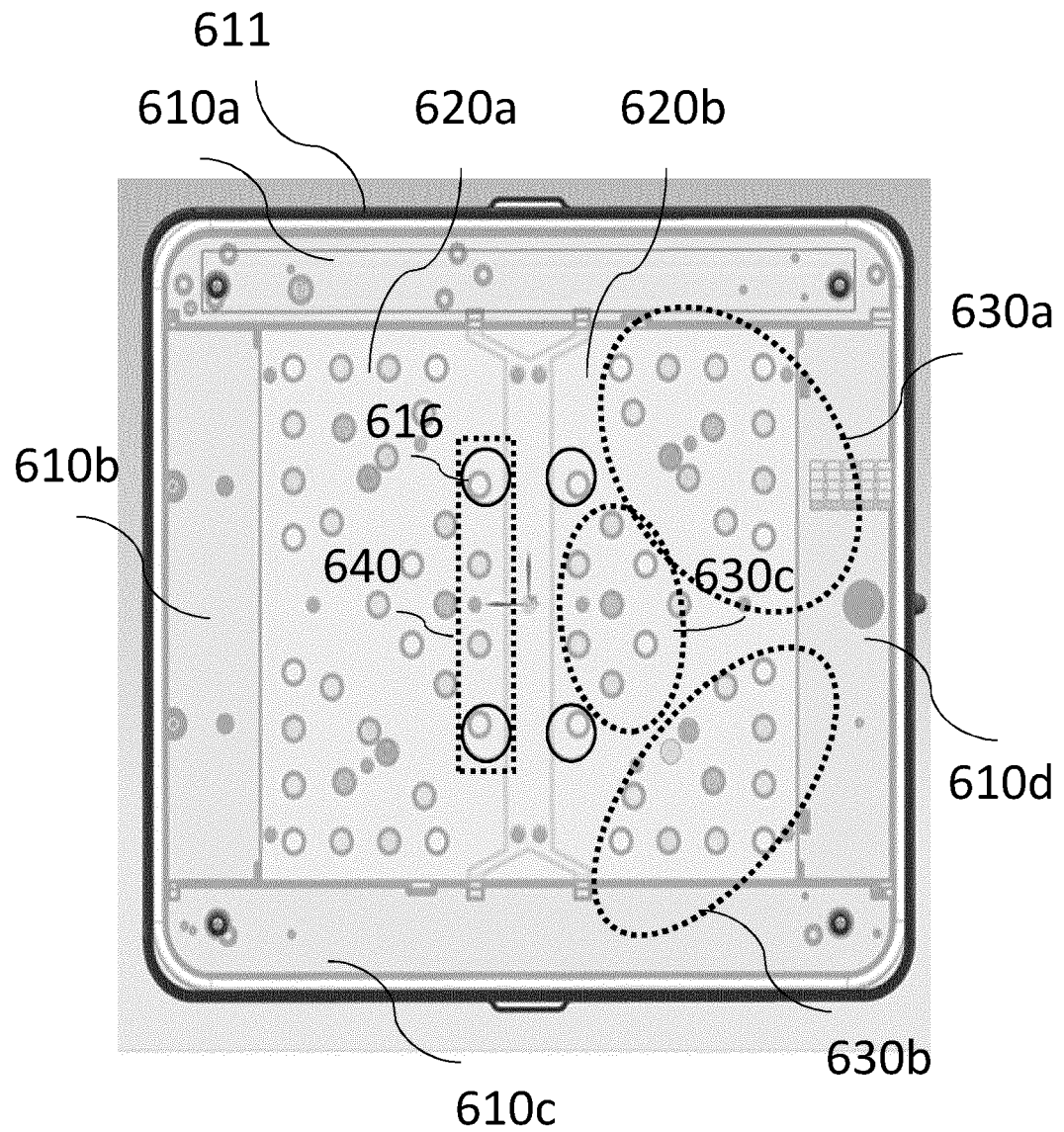
FIG. 6 shows bottom view embodiment of the lighting device.
Figure 7:
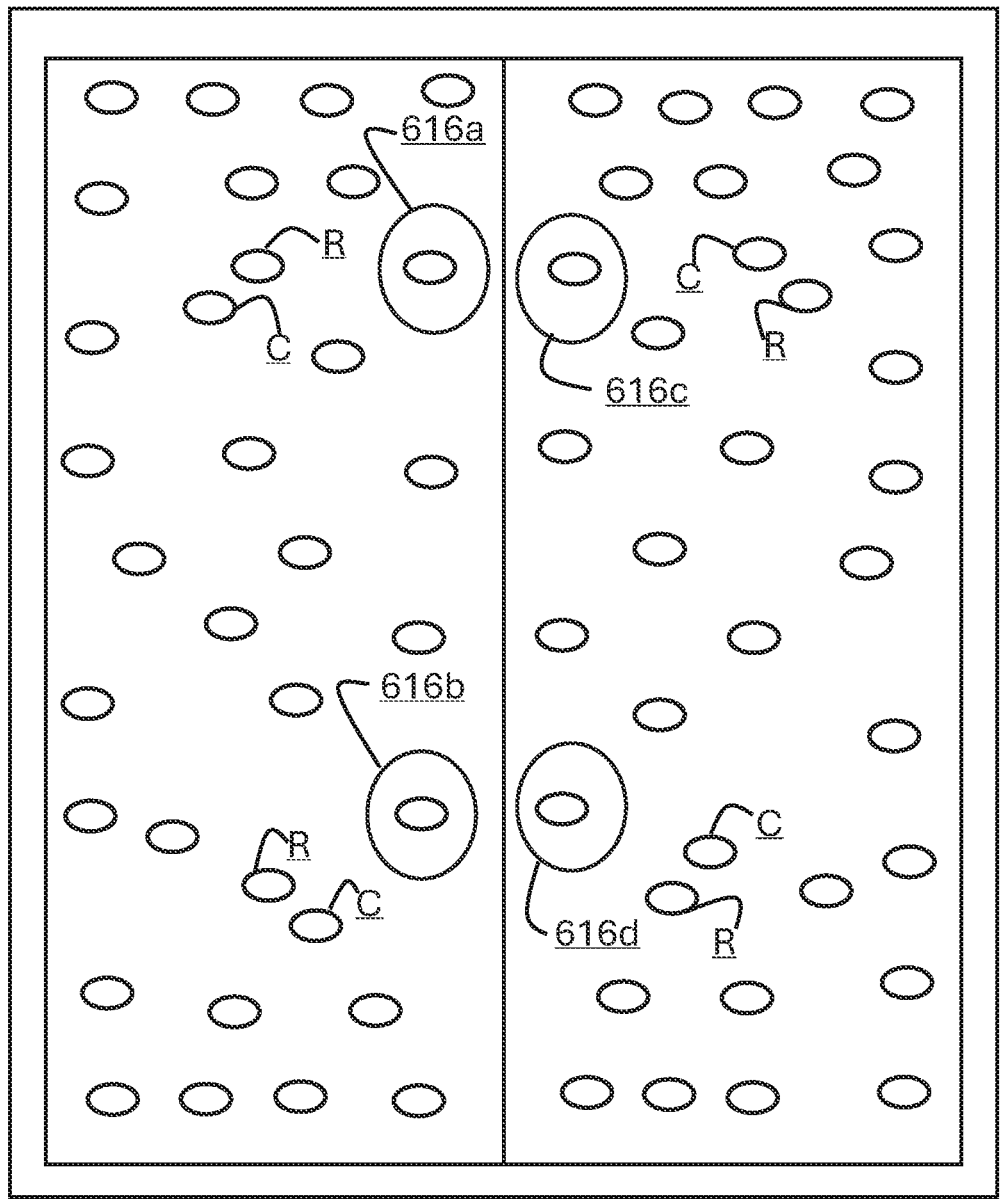
FIG. 7 shows another bottom view embodiment of the lighting device.

FIG. 6 and FIG. 7 show bottom view embodiment of the lighting device 600. FIG. 6 exemplary shows a technical drawing of the lighting device. The lighting device 600 may further comprise at least four regions 610a-d which are diagonally mirrored in a corner area on the base layer 611; at least two regions 620a-b which are diagonally mirrored around the center area on the base layer 611. The lighting device 600 may further comprise at least three second subset 630a-c (shown as dotted circles) comprising lighting elements with emitting spectrum of blue and red/amber colored light mirrored around the center of the base layer 611. The lighting device 600 may further comprise at least one first subsets 640 (shown as dotted rectangles) mirrored around the center of the base layer 611 comprising at least two lighting elements; wherein the light transmission affecting device comprises at least four opening 616 associated with at least four lighting elements of the first subset mirrored around the center.

One of the problems observed by the inventors when including colored LEDs in a lighting device 600 for illuminating aquaria is that colored shadows created by for example amber/red R and cyan C lighting elements (as shown in FIG. 7) are considered to be more disturbing and unnatural than the colored shadows created by the different shades of white (different color temperatures) and blueish lighting elements. Further, as people try to reduce cost of lighting devices for aquaria, a reduction of the number of lighting elements in the lighting device 600 leads to a larger average lighting element spacing, reduces color mixing and hence more visible color shadows. This is particularly the case if the number of amber/red R and cyan C LEDs, which are not considered primary colors for aquarium lighting, is significantly reduced. To minimize amber/red R and cyan C color shadows, the distribution of lighting elements in the lighting device 600 may be characterized by:

The amber/red R and cyan C lighting elements are clustered in pairs containing one amber/red and one cyan source (as shown in FIG. 7).

The centre-centre distance between the lighting elements in an amber/red+cyan pair is less than half the average nearest-neighbour distance for the other lighting elements.

The orientations of all the amber/red+cyan pairs are all different (e.g. the orientations are all perpendicular or anti-parallel).

To minimize overall color shadows, in an example, the lighting elements' positions may not be on a regular rectangular grid (because the human eye is more sensitive to patterns of straight lines compared to more irregular patterns).

The method 400 may be executed by computer program code of a computer program product when the computer program product is run on a processing unit of a computing device.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors or even the 'cloud'.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A lighting device for illuminating an aquarium, comprising:
   a base layer;
   a plurality of lighting elements mounted on the base layer and comprising a first and a second subset of lighting elements arranged for emitting a first and a second spectrum of light respectively, into the aquarium; and
   a light transmission affecting device arranged for affecting the transmission of the light from the plurality of lighting elements; wherein the light transmission affecting device is arranged for passing at least a part of the light from at least one lighting element of the first subset having the first emitting spectrum and processing the light from at least one lighting element of the second subset having the second emitting spectrum;
   wherein the first emitting spectrum comprises white light or a first colored light;
   wherein the first colored light comprises a wavelength in a first range with a peak wavelength below 485 nm; and the second emitting spectrum comprises a second colored light; wherein the second colored light comprises a wavelength in a second range with a peak wavelength larger than 485 nm.

2. The lighting device according to claim 1; wherein the plurality of lighting elements is arranged in a geometric distribution on the base layer and wherein the light transmission affecting device is designed to match and align with the geometric distribution of the plurality of lighting elements on the base layer.

3. The lighting device according to claim 1; wherein a distance between any two nearest neighboring lighting elements in the second subset is less than half of an average distance between nearest neighboring lighting elements in the first subset.

4. The lighting device according to claim 1; wherein the light transmission affecting device comprises at least one opening co-located with the at least one lighting element of the first subset; and wherein the light transmission affecting device is arranged for passing at least a part of the light from the at least one lighting element of the first subset from the at least one opening.

5. The lighting device according to claim 4; wherein the light transmission affecting device comprises at least one removable element arranged for covering the at least one opening; and wherein the light transmission affecting device is arranged for passing at least a part of the light from the at least one lighting element of the first subset when the at least one removable element is removed from the at least one opening.

6. The lighting device according to claim 4; wherein a physical dimension of the at least one opening is determined based on a crosstalk between the at least one lighting element and a neighboring lighting element in the first subset and/or in the second subset.

7. The lighting device according to claim 1; wherein the light transmission affecting device comprises a plate having a patterned diffuser, with at least one opening in the diffuser pattern for passing at least a part of the light from the at least one lighting element of the first subset; and wherein the patterned diffuser is arranged for processing the light, by diffusing the light, from the at least one lighting element of the second subset.

8. The lighting device according to claim 1; wherein the light transmission affecting device comprises a light guide having at least one opening in the light guide for passing at least a part of the light from the at least one lighting element of the first subset; and wherein the light guide is arranged for processing the light, by distributing the light, from the at least one lighting element of the second subset.

9. The lighting device according to claim 1; wherein the light transmission affecting device comprises a plate having a patterned diffuser.

10. The lighting device according to claim 1; wherein the each of the plurality of lighting elements comprises an LED.

11. A method of illuminating an aquarium, comprising:
   providing a light output from a plurality of lighting elements comprising a first and a second subset of lighting elements arranged for emitting a first and a second spectrum of light respectively;
   passing at least a part of the light from at least one lighting element of the first subset having the first emitting spectrum through a light transmission affecting device;
   processing the light from at least one lighting element of the second subset having the second emitting spectrum using the light transmission affecting device, and
   providing the passed and the processed light to the aquarium;
   wherein the first emitting spectrum comprises white light or a first colored light which appears natural in the aquarium; wherein the first colored light comprises wavelength in a first range with peak wavelength below 485 nm; and the second emitting spectrum comprises a second colored light which appears non-natural in the aquarium; wherein the second colored light comprises wavelength in a second range with a peak wavelength larger than 485 nm.

* * * * *